Sept. 24, 1929.  B. E. CROWELL  1,728,928
APPARATUS FOR MANUFACTURING REENFORCED SHEATHING
Filed Feb. 1, 1927   3 Sheets-Sheet 3
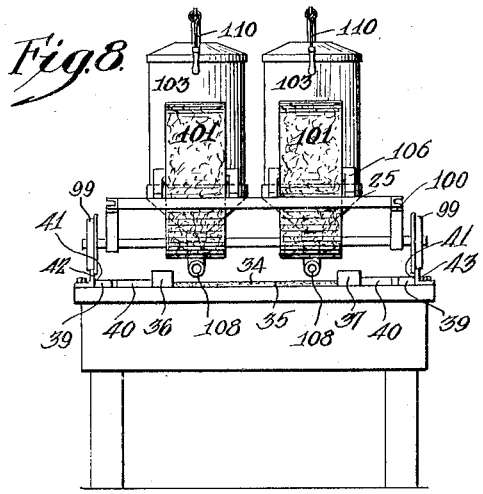

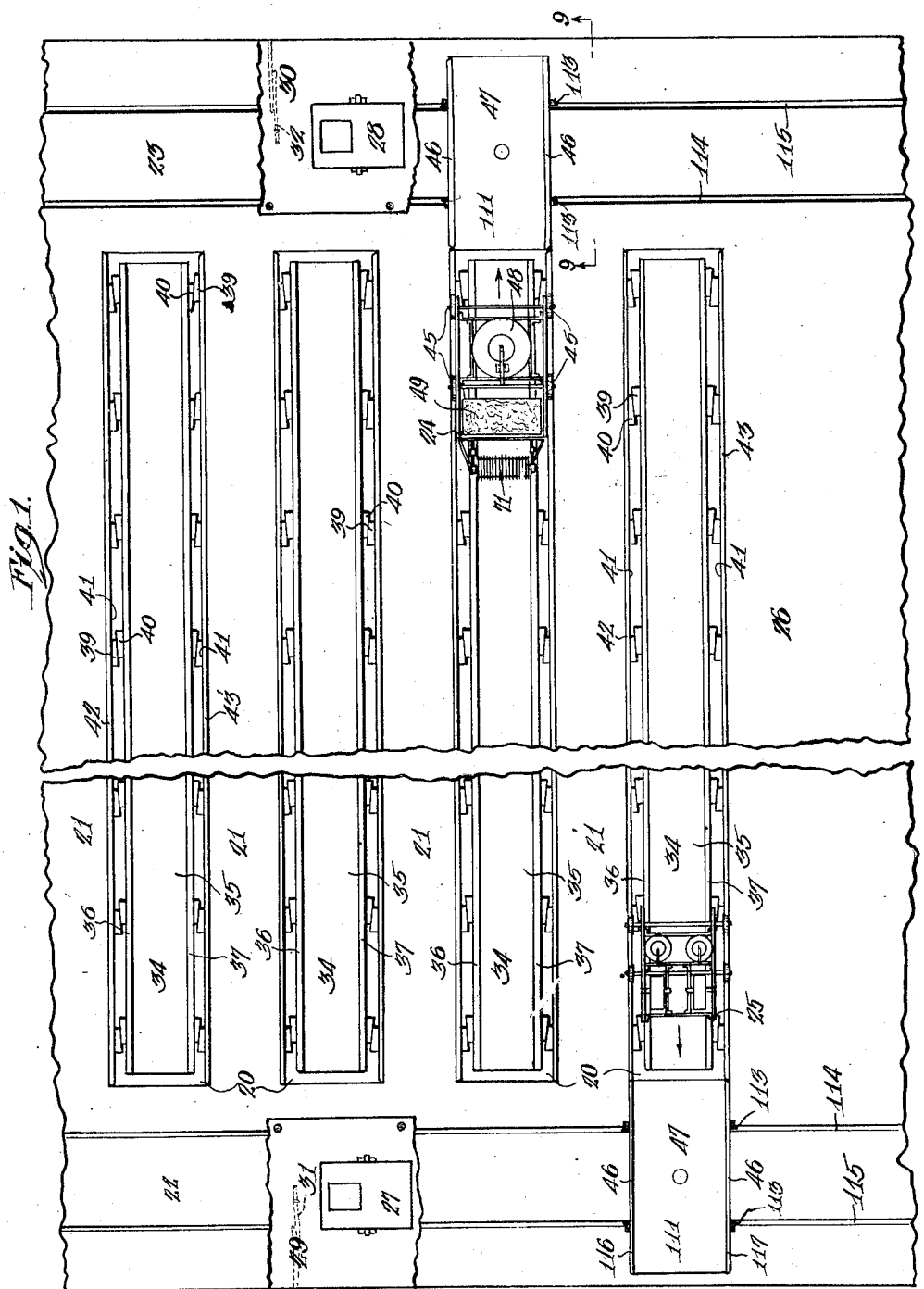

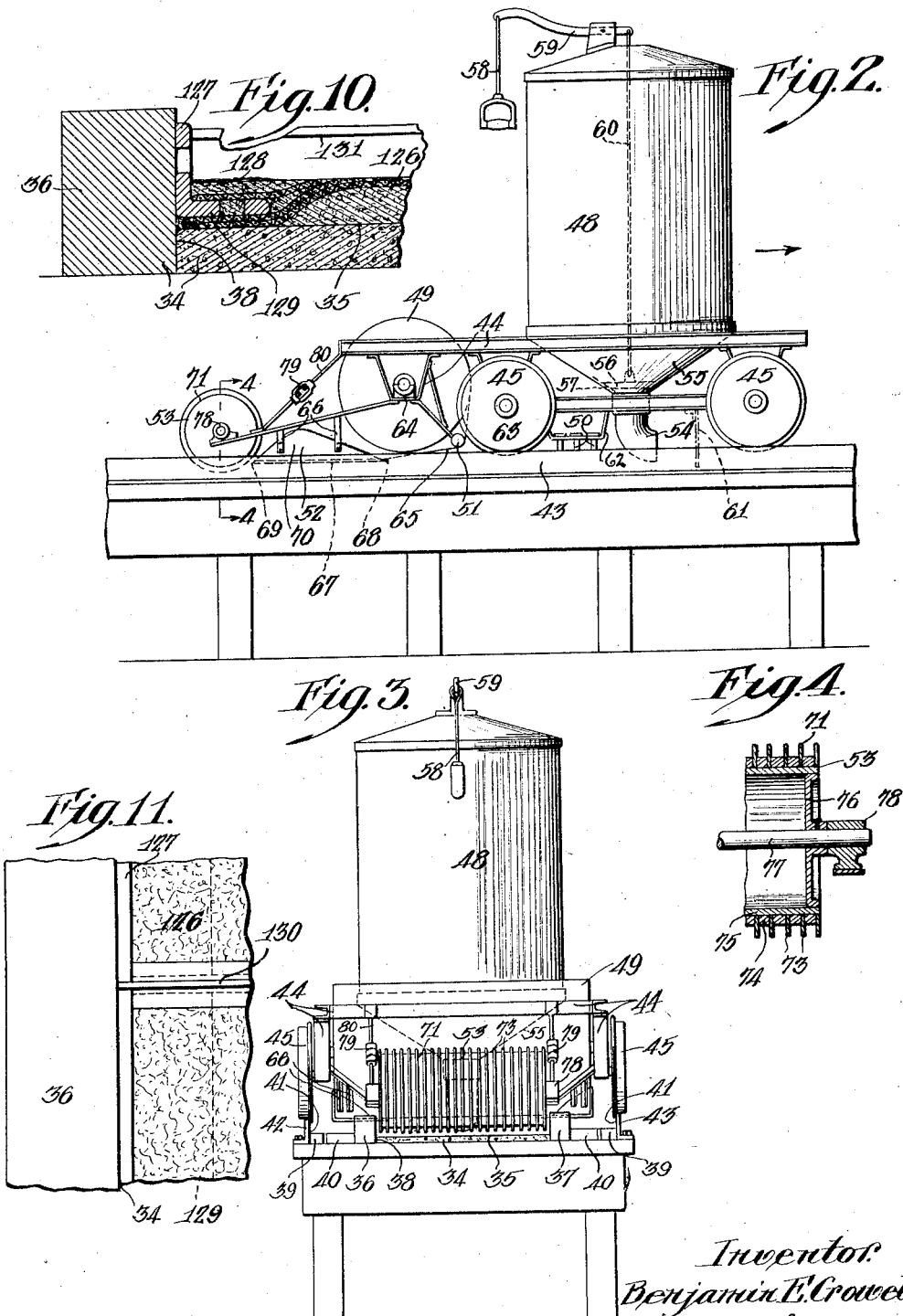

Patented Sept. 24, 1929

1,728,928

UNITED STATES PATENT OFFICE

BENJAMIN E. CROWELL, OF MEDIA, PENNSYLVANIA

APPARATUS FOR MANUFACTURING REENFORCED SHEATHING

Application filed February 1, 1927. Serial No. 165,113.

My invention relates to the manufacture of reenforced sheathing for making partition walls and the like.

This sheathing is normally made of plaster and burlap, reenforced along the sides with perforated angle irons and reenforced at the ends and one or more intermediate points with angle irons or channels, that are also preferably perforated.

The sheathing is usually formed in moulds about two feet wide and of indefinite length.

The bottom of a mould is covered with perhaps one-half inch of liquid or "gaged" plaster and the fabric reenforcing, usually burlap, is pushed into the wet plaster over the width and length of the mould.

The opposing side angles are then pushed to place, with their flats horizontal and vertical, the horizontal flat of each angle being pressed down into the plaster and the vertical flat lying out along the side of the mould. The submerged horizontal flat portions are then tied to place by full-length overlapping narrow strips of burlap and additional plaster.

Light channel irons or other suitable reenforcing members, are then placed across the ends of each sheet and usually at one or more intermediate points, being tied to place by plaster and sisal or jute fibre, or less usually plaster and burlap.

The sheathing is made in definite lengths, as 8 feet and 10 feet, according to requirements of the building trade. The angle irons along the sides are cut to the length of the sheathing and evenly placed in opposing pairs so that each long moulding comprises a number of sheets that are readily cut apart between the successive pairs of side angles. The transverse reenforcing is usually at each end at the middle of each sheet.

The main object of my invention is to provide a method and apparatus for inexpensive and rapid manufacture of sheathings of this general character, whether made of plaster, burlap and angle iron reenforcing or made of other suitable plastic material adapted to mould and harden with the same or other suitable reenforcing materials.

Throughout this specification and the appended claims the word burlap is intended to include commercial burlap and any suitable reenforcing material adapted to delivery from a roll and to be pressed into the soft plastic material, and the word plaster is intended to include the plaster of commerce and any suitable plastic material adapted to mould and harden. Burlap thus includes the burlap of commerce, wire mesh, many suitable fabrics, etc., and plaster includes the plaster of commerce and many different cements.

A further purpose is to simultaneously deliver gaged plaster and reenforcing burlap from a common carriage into a mould. I preferably deliver the plaster in front of the burlap, spread it to uniform depth, deliver the burlap on to the plaster and then press the burlap into the plaster.

A further purpose is to press a reenforcing burlap into a bed of gaged plaster alternately by means of a multiple disc roll or by means of spaced fingers resiliently pressing downwardly.

A further purpose is to lay a bed of gaged plaster and reenforcing burlap over the bottom of a mould in moving a carriage along the mould, to then lay reenforcement strips along opposite sides of the bed, and then to lay additional reenforcing burlap and gaged plaster along the strips in moving a second carriage along the mould.

A further purpose is to arrange moulds for the manufacture of reenforced sheathing along parallel benches, operating upon the moulds successively by one or more carriages adapted to lay a bed of gaged plaster and reenforcing burlap.

A further purpose is to operate a machine for moulding reenforced plaster sheathing with definite charges of plaster, and to prevent gaged plaster from setting fast to surfaces of the machine by washing the surfaces clean between the charges and preferably then spraying the surfaces with oil.

A further purpose is to roll a machine, adapted to lay a bed of gaged plaster and reenforced burlap, along the length of a sheathing mould on to a turn table carriage, using the carriage to move the machine to an adjacent parallel mould and to turn it end for end, and then after washing and recharging the machine rolling the machine in reverse direction along the parallel mould.

Further purposes will appear in the specification and in the claims.

I have elected to show one main form only of the many different forms of my invention, showing a detail however in two forms and selecting a main form that is practical and efficient in operation and which well illustrates the principles involved.

Figure 1 is a fragmentary top plan view of a moulding floor embodying my invention.

Figures 2 and 3 are side and front elevations respectively of a machine shown diagrammatically in Figure 1 for laying a bed of gaged plaster and burlap.

Figure 4 illustrates structure for pressing burlap into a bed of gaged plaster and is a fragmentary section taken upon the line 4—4 of Figure 2.

Figure 5 is a fragmentary side elevation of alternative structure for pressing burlap into a bed of gaged plaster, being a section upon the line 5—5 of Figure 6.

Figure 6 is a top plan view of Figure 5.

Figures 7 and 8 are side and front elevations respectively of a machine shown diagrammatically in Figure 1 for laying finishing beds of gaged plaster and burlap along the side reenforcement strips of a sheathing moulding.

Figure 9 is an enlarged fragmentary section of Figure 1 taken upon the line 9—9 thereof and illustrating a mixing machine and turn-table shown diagrammatically in Figure 1.

Figures 10 and 11 are respectively an enlarged fragmentary vertical section through a mould and laid sheathing, and an enlarged fragmentary top plan view of adjacent laid sheets of sheathing.

Like numerals refer to like parts in all figures.

Describing in illustration and not in limitation and referring to the drawings:—

The moulding floor (Figure 1) is taken up by long moulding benches 20, with intermediate walk ways 21 for operators and floor spaces 22 and 23 across the ends of the benches where the moulding machines 24 and 25 are washed, recharged and transferred from bench to bench. Additional floor space is shown at 26 for temporarily storing raw materials and finished sheathing.

Machines 27 and 28 (Figures 1 and 9) for mixing the gaged plaster and recharging the moulding machines, are shown mounted upon overhead platforms 29 and 30 at opposite ends of the benches. Alternatively one of these machines may be dispensed with, though I prefer having one at each end as shown.

Facilities for washing the moulding machines are indicated at 31 and 32, as flexible water-hose near the charging platforms 29 and 30 respectively. Hose 33 upon the charging platforms are used for washing and recharging the mixing machines with water.

A sheathing mould 34 runs along the top of each bench for substantially the length of the bench and comprises a horizontal floor 35, raised somewhat above the bench and removable sides 36 and 37 which rest on the bench and laterally engage the raised floor 35 and 38 along their full length.

The sides 36 and 37 are suitably of wood and are preferably removably held to place by pairs of cooperating wedges 39 and 40.

These wedges (Figures 1 and 8) are spaced at intervals along the sides. One wedge of each pair engages the side of the mould and the other engages the inner face 41 of one of the rails 42 and 43.

The rails 42 and 43 are carried along the outer edges of the top of the bench. Each forms an abutment for the wedges 39. Together the rails form a track for the moulding machines 24 and 25.

I have shown the rails of angle section but the sectional form used may be determined by preference and available material.

*Moulding machines*

There are two moulding machines, of which the larger, 24, lays an initial bed of gaged plaster and burlap over the whole bottom of any mould upon which it is operating, and the smaller 25 lays relative narrow beds of gaged plaster and burlap along the sides of the mould after the side reenforcement strips have been inserted and to tie the side reenforcement strips to place.

The larger machine is best seen in Figures 2 and 3. It includes a carriage framework 44 that rolls in the direction of the arrow (Figure 2) upon wheels 45 along the bench rails 42 and 43 and upon the corresponding rails 46 of turn-table carriages 47 which operate in the floor spaces 22 and 23 across the ends of the benches.

The carriage framework supports a supply tank 48 for gaged plaster and a supply roll 49 of burlap; also one or more plaster spreaders 50, burlap guides 51 and 52, and structure 53 for pressing the burlap into the plaster.

The plaster supply tank is shown of circular section which is advantageous in that interior angles are avoided, and thereby the interior of the tank more easily kept clean from set plaster.

A delivery spout 54 depends from the conical bottom 55 to a point somewhat above the middle of the floor of the mould. It is preferably directed forwardly to give the stream of gaged plaster more time to spread out over the floor of the mould before its engagement by the spreaders 50.

The delivery of plaster is controlled by a conical valve 56 inside the tank. This valve is adapted to engage a suitable seat 57 at the entrance of the spout, and is operated at a handle 58 outside the tank. The handle 58 is operatively connected in any suitable way to the valve, as by rocker lever 59 and link 60.

Optionally a transverse baffle 61 (shown dot-and-dash Figure 2) may be supported from the frame structure of the carriage to lie across the mould somewhat ahead of the spout. This baffle will lessen the forward flow from the spout and direct the stream from the spout laterally across the mould. An operator may obtain uniform depth of bed by controlling the valve to give uniform conditions at this baffle.

The use of the baffle 61 will usually be advantageous or not according to the character of the gaged plaster used.

The spreaders 50 are supported at each end by suitable brackets 62 and extend downwardly into and substantially across the mould. Desirably they are somewhat forwardly bowed at the middle and in effect are baffles to direct the plaster to the sides of the mould.

The bottom edges of the spreaders are at gaged distance above the floor of the mould, usually somewhat less than the desired thickness of the bed of plaster to be laid by the machine.

It is desirable to use one or more spreaders according to the character of gaged plaster used.

The supply spool 49 of burlap is mounted across and above the mould somewhat behind the spreaders 50, and optionally also behind the rear wheels 63 of the carriage.

The burlap roll 49 is shown in the illustration wider than the mould, as it is often desirable to use burlap wider than the mould, as for example a 36-inch strip of burlap in a 24-inch mould.

When the wider burlap is used, its sides are folded over so that the folded strip fits across the mould, which gives a double thickness of burlap reenforcing along the sides of the sheathing, and also permits the use of burlap of standard width.

The burlap spool 49 is journaled to rotate freely in suitable bearings 64 upon the frame structure 44 of the carriage, and the unwinding burlap 65 is led around the guiding roll 51, through a folder 52 to beneath the structure 53 which presses the folded strip of burlap into the wet plaster.

The folder 52 may be of any suitable type and as shown comprises a sheet metal guide supported by brackets 66 from the frame structure.

The bottom 67 of the sheet reaches across the mould beneath the unwinding strip of burlap, being as wide as the unfolded burlap at its forward end 68 and getting progressively narrower until at its rear end 69 it has substantially the width of the mould.

The sides 70 of the folder are bent upwardly and inwardly and converge rearwardly to give the desired final width to the folded strip.

Before starting to roll the machine 24 along any mould, the outer end of the burlap strip 65 is led around its guiding roller and through the folder, properly folded to fit across the mould and then fastened to place in the rear end of the mould.

The roll 49 unwinds as the machine progresses along the mould, and the folding over of the sides, made initially by hand at the forward end of the strip, continues automatically under the guiding action of the folder.

A folder is of course unnecessary if the strip of burlap used is already the width of the mould.

The structure 53 for pressing the burlap into the plaster is optionally a multiple disc roll, illustrated at 71 of Figures 2, 3 and 4, or spaced runner members 72 illustrated in Figures 5 and 6.

In the multiple disc roll, relatively thin discs 73 and spacing sleeves 74 alternate along a tubular cylinder 75. The ends of the cylinder 75 are carried on flange discs 76 fastened to a shaft 77 upon which the cylinder journals in suitable bearings 78.

The roll 71 is preferably vertically adjustable, as by means of turn buckles 79 in supporting links 80, and the roll is normally adjusted so that the bottoms of the discs 73 are somewhat above the floor 35 of the mould.

The discs press burlap into the plaster by rolling action and exert no tendency to drag the burlap forwardly.

Any wet plaster between the discs is washed away by a stream of water before it begins to set—the surfaces of the machine normally being all washed clean after each mould has been operated on.

The runner members 72 illustrated in Figures 5 and 6 form an alternative structure for pressing the burlap into the plaster.

Frame members 44' are spaced somewhat above the mould upon opposite sides thereof and are connected by transverse parallel shafts 81 and 82 which support and guide the runner members 72.

The frame members are perforated to receive the reduced ends 83 and 84 respectively of the shafts 81 and 82.

The forward shaft 81 is grooved at 85 at spaced intervals between the frame members to receive forward hook ends 86 of the runners 72. Nuts 87 upon the threaded reduced ends 83 of the shaft rigidly fasten the ends of the shaft to the frame members.

The rearward shaft 82 is slotted upon its upper side diametrically at 88 at spaced intervals corresponding to the grooves 85 in the shaft 81. The reduced ends 84 extend through the perforations in the frame members 44' and carry spring washers 89 and external collars 90. The collars 90 are pinned to the shaft and provided with laterally extending handles 91, by which the shaft may be angularly adjusted, the spring washers being sufficiently stiff to maintain any set adjustment.

The runner members 72 are all alike, preferably of sheet metal and of sufficient weight to serve their purpose, or else spring pressed to duty. Each has forwardly a hook 86 adapted to hook over the shaft 81 in one of the grooves 85, and a lower edge 92 that slopes downwardly toward the rear to a point 93 that is at any desired small distance above the bottom of the mould and then curves abruptly upwardly to a rearwardly projecting portion 94 of the runner.

The rearward projections 94 are received in the slots 88 of the shaft 82 and supported upon the shaft 82 at the bottom of these diametral slots.

Any desirable small vertical adjustment in the height of the runners above the floor of the mould is made simultaneously on all the runners by shifting the angular position of the shaft 82 at one of the handles 91. As best seen in Figure 5 this changes the vertical height of the supporting point 95 at one end of the diametral slots 88.

In Figure 5 I show the rear ends of the runner members pulled downwardly by individual springs 96 anchored at 97 to a suitable transverse supporting member 98. These springs are dispensed with when the runners are of sufficient weight to press the burlap into the plaster without their use.

The smaller moulding machine 25 is best seen in Figures 7 and 8 and operates in rolling along the rails 42 and 43 upon suitable wheels 99, in the direction of the arrow (Figure 7). It lays narrow beds of gaged plaster and burlap along the renforcement side angle irons, which are inserted by hand after the initial bed of plaster and burlap has been laid by the larger machine 24.

Carriage frame structure 100 supports a laying unit upon each side of the mould. Each unit comprises a spool 101 of narrow width burlap, a guiding roll 102, a relatively small tank 103 and a spreader 104.

The spools are journaled at 105 toward the front of the machine in suitable bearings 106 on the frame structure and deliver unwinding strips 107 to the under side of the guiding rolls 102 which are journaled slightly above the mould.

As with the larger machine, the outer ends of the strips from the spools are suitably fastened down before the machine begins to operate.

Except as to size, the tanks 103 are shown generally similar to the tank 48 of the larger machine, each being provided with a forwardly directed spout 108, and an interior valve 109 operated by an outside handle 110 that are respectively like the corresponding members of the larger machine.

Unlike the large machine the burlap strips are laid ahead of the streams of gaged plaster from the spouts, the streams of plaster therefore delivering on to the strips of burlap.

The spreaders 104 are placed somewhat behind the delivery spouts 108 and are suitably formed to give even beds along the sides of the mould.

The moulds are desirably a hundred feet or more in length and the machines are preferably each charged with an amount of gaged plaster just sufficient to operate for the length of one mould,—a machine being thus charged with just the right amount of plaster before starting to operate upon a mould and just empty as the end of the mould is reached.

When a machine reaches the end of a mould, I roll it on to a turn-table carriage 47, Figures 1 and 9, for washing, recharging and transfer to the next mould.

The turn-table 111 is mounted upon a carriage 112 having wheels 113 rolling upon floor rails 114 and 115 transversely in front and across the ends of the benches. Rails 116 and 117 on top of the turn-table mate with the rails 42 and 43 upon the respective benches.

When an empty machine is rolled on to the turn-table, the turn-table is swung through 90 degrees and the carriage rolled to a washing station at 31 or 32.

All surfaces of the machine that have been exposed to the gaged plaster are here washed clean, conveniently by playing upon the surface with a hose.

After washing the surfaces they are desirably sprayed with oil or other spray adapted to lessen their adherence to plaster, and the machine may then be moved under the mixing and charging tank 27 or 28 and recharged for operating upon another mould.

The mixing and charging tanks 27 and 28 (Figures 1 and 9) are alike, each comprising a cylinder 118 pivotally supported upon horizontal trunnions 119 in bearings 120 on standards 121, the cylinder being provided with a suitable charging door 122, mixing paddles 123, and vent valve 124.

The mixes are of predetermined definite size, usually being sufficient to charge both the molding machines once, and the mixer is washed clean of plaster each time it is emptied, preferably also being sprayed with oil or the like.

In mixing a charge, the cylinder is filled with water to a predetermined mark, plaster added, from a suitable delivering conveyer 125, until the water rises to a second predetermined mark and the plaster and water then mixed by rotating the paddles.

The conveyor illustrated is one of the chainbucket type and delivers dry plaster to the mixer from a suitable storage bin in the basement or elsewhere.

I usually prefer to wash the moulding machines after every moulding operation— therefore washing and recharging at each end of the benches.

Optionally, however, when the moulds are not too long and the characteristics of the plaster permit, I may wash and recharge at one end only of the moulds, the supply tanks then carrying sufficient plaster for two long moulds travelling from one end to the other over the first mould to a turn-table where they are still half full and are turned around and transferred to the second mould, and then travel back over the second mould to the turn-table at the first end for washing, recharging and transfer to a third mould.

The spools of burlap are advantageously wound with enough burlap for two moulds, and with a small excess of burlap to avoid any danger of running short while still on a mould. The excess of burlap upon an old spool is available for use in tying the transverse reenforcement members, which are usually inserted at the ends and middle of each sheet, and tied to place with scraps of burlap and plaster.

In operation, a mould preferably lightly oiled to prevent the moulded sheet from sticking, is operated upon by the larger moulding machine which lays a bed of plaster and burlap 126 (Figure 10) usually about one-half inch deep over the whole mould, the burlap being buried in the plaster but somewhat away from the bottom of the mould so as not to interfere with the fineness of the surface finish.

Operators follow the larger machine upon opposite sides of the bench and place the side angle iron reenforcements 127, into the initial bed along the sides of the mould.

The smaller moulding machine follows these operators, laying a bed 128 of burlap and plaster overlapping and tying in the immersed flats 129 of the side angle irons along the length of the mould.

Other operators follow the smaller machine and place separating strips or wedges 130 between adjacent sheets of sheathing and the transverse reenforcement strips 131 across the ends and middle of each pair of opposing side angle irons. The separating wedges are preferably about the thickness of a rather thick knife. They press the burlap down to the bottom of the mould for easy cutting after the plaster has set, and if desired may have a lower edge sufficiently sharp for use in cutting the burlap after the plaster has set.

The transverse reenforcement strips are suitably light channels or angles, and may be considerably lighter than the side angle irons.

The above operations follow sequentially upon the successive moulds.

After the plaster in a mould has set sufficiently the wedges 39 and 40 holding the sides 36 and 37 of the mould to place are loosened, the sides lifted away, the separating strips removed, the sheets cut apart between the angles by cutting the burlap at the bottom of the spaces left by the separating strips, and the sheets removed from the mould, preferably being made up in bundles for storage and shipment, with finish faces together.

In view of my invention and disclosure, variations and modifications to meet individual whim or particular need will become evident to others skilled in the art and I claim all such in so far as they fall within the reasonable spirit and scope of my invention.

Having thus described my invention, what I claim as new and desire to secure by Letters Patent is:—

1. In manufacturing reenforced sheathing, a bench, a mould along the top thereof, comprising a flat bottom member projecting somewhat upwardly from the top of the bench, side members laterally engaging and resting on the bench, a rail spaced from each side member away from the mould and fastened on the bench, and cooperating pairs of wedges between the respective rails and the side members spaced along opposite sides of the mould holding the side members to place against the bottom member.

2. In manufacturing reenforced sheathing, a bench, a mould along the top thereof, comprising a flat bottom member projecting upwardly somewhat above the top of the bench, and side members laterally engaging the bottom member and resting on the top of the bench, rails on opposite sides of the bench spaced from the side members, cooperating pairs of wedges between the side members and the adjacent rails removably holding the side members to place against the bottom member of the mould, and a moulding machine having wheels supported upon the rails and adapted to lay a bed of plaster and burlap in and along the mould.

3. In manufacturing reenforced sheathing, a row of long parallel benches, a sheathing mould along the top of each bench comprising a fixed bottom member projecting somewhat upwardly from the top of the bench and side members abutting opposite edges of the bottom member and resting on the top of the bench, rails spaced from the side members away from the mould and on top of the bench, spaced pairs of operating wedges between each side member and the adjacent rail removably holding the rail to place against the bottom member, and a moulding machine adapted to operate upon the mould to lay a bed of burlap and plaster along the mould and having wheels upon the rails.

4. In manufacturing reenforced sheathing, a moulding machine comprising a carriage adapted to roll along a mould, a supply tank above the mould upon the carriage adapted to deliver gaged plaster along the mould, a supply roll of burlap supported upon the carriage above the mould, a burlap guide adapted to guide a strip of burlap to unwind from the roll to a bed of plaster laid by the supply tank, and mechanism carried by the carriage for pressing the burlap into the bed of plaster.

5. A machine for laying a bed of plaster and burlap along a horizontal sheathing mould, comprising a carriage adapted to roll along the mould, a supply tank for gaged plaster having a delivery spout for delivering the plaster into the mould, a roll of burlap mounted upon the carriage to the rear of the supply tank and above the mould and a burlap guide for guiding a strip of burlap in unwinding the roll on to a bed of wet plaster laid by the supply tank, and presser members spaced across the mould, supported by the carriage and adapted to press the unwinding strip of burlap into the plaster, presenting clearance spaces between the successive members to receive the plaster pressing upwardly through the burlap.

6. A machine for laying a bed of plaster and burlap along a horizontal sheathing mould, comprising a carriage adapted to roll along the mould, a supply tank for gaged plaster and a delivery spout for delivering the plaster into the mould, a roll of burlap mounted upon the carriage to the rear of the supply tank and above the mould and a burlap guide for guiding a strip of burlap from the roll on to a bed of wet plaster laid by the supply tank and presser members spaced across the mould and supported by the carriage and adapted to press the unwinding strip of burlap into the plaster, presenting clearance spaces between the successive members to receive the plaster pressing through the burlap as the burlap is pressed down and means for adjusting the height of the presser members.

7. A moulding machine for laying a bed of plaster and reenforcing burlap along a sheathing mould comprising a carriage adapted to roll along the mould, a supply tank for gaged plaster having a delivery spout into the mould, a supply roll of burlap, burlap guides for delivering the strip of unwinding burlap on to the bed of plaster laid by the spout and a roll carried by the carriage and having multiple discs spaced along its length adapted to roll along the strip of burlap to press the burlap into the plaster by its engagement with the discs.

8. In manufacturing reenforced sheathing, a moulding machine for laying a bed of plaster and reenforcing burlap along a sheathing mould, comprising a carriage adapted to roll along a mould, a supply tank thereon having a forwardly directed spout for delivery into the mould, a spreader adapted to spread the plaster delivered from the spout over the mould, and mechanism for laying a strip of burlap over the evened bed of plaster and for pressing the strip into the bed.

9. In manufacturing reenforced sheathing, a moulding machine for laying narrow beds of plaster and burlap along opposite sides of a bed of plaster and burlap and reenforced side angles, comprising a carriage adapted to roll along the bed, a supply roll of burlap upon each side of the forward end thereof, burlap guides directing strips of burlap from the respective rolls rearwardly toward the machine on to the bed upon opposite sides thereof, supply tanks of gaged plaster on opposite sides of the carriage back of the respective burlap rolls, delivery spouts therefrom for delivering plaster on to the strips of burlap from the respective rolls and a spreader back of each spout for spreading the respective narrow beds of plaster over the strips of burlap.

BENJAMIN E. CROWELL.